United States Patent
Agarwal et al.

(10) Patent No.: US 9,552,453 B1
(45) Date of Patent: Jan. 24, 2017

(54) INTEGRATED CIRCUIT WITH POWER NETWORK AWARE METAL FILL

(71) Applicant: FREESCALE SEMICONDUCTOR, INC., Austin, TX (US)

(72) Inventors: Rishabh Agarwal, Noida (IN); Sumit Kumar Jha, Delhi (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 0 days.

(21) Appl. No.: 14/860,726

(22) Filed: Sep. 22, 2015

(51) Int. Cl.
*G06F 17/50* (2006.01)

(52) U.S. Cl.
CPC ....... *G06F 17/5077* (2013.01); *G06F 17/5072* (2013.01)

(58) Field of Classification Search
CPC .............. H01L 2224/73265; H01L 23/528; H03K 19/0948; H03K 19/17704; G06F 17/5072; G06F 17/5077; G06F 3/0321; G06F 3/03545; G06F 17/5068; G11C 5/025
USPC ................................ 716/126–131
See application file for complete search history.

(56) References Cited

U.S. PATENT DOCUMENTS

| | | | |
|---|---|---|---|
| 6,057,231 A | 5/2000 | Givens et al. | |
| 6,748,579 B2 | 6/2004 | Dillon et al. | |
| 7,240,314 B1 | 7/2007 | Leung | |
| 7,328,419 B2 | 2/2008 | Vuong et al. | |
| 7,383,521 B2 | 6/2008 | Smith et al. | |
| 7,565,638 B2 | 7/2009 | Hoerold | |
| 7,614,024 B2 | 11/2009 | Bothra | |
| 8,753,900 B2 | 6/2014 | Koti et al. | |
| 2005/0273747 A1* | 12/2005 | Malhotra | G06F 17/5077 716/129 |
| 2007/0204250 A1* | 8/2007 | Moroz | G06F 17/5068 716/55 |
| 2009/0031267 A1 | 1/2009 | Ueki | |
| 2013/0200945 A1* | 8/2013 | Siguenza | G06F 17/505 327/544 |

\* cited by examiner

*Primary Examiner* — Binh Tat
(74) *Attorney, Agent, or Firm* — Charles E. Bergere

(57) ABSTRACT

In the physical design of an integrated circuit, comparing metal fill locations with an average least resistance path (LRP) for a cell and then filling the location with either power or ground tiles based on the comparison. For each metal layer, all of the metal fill locations are determined and nearby metal fills, i.e., those within a predetermined radius of a located metal fill are connected. A Design Rule Check (DRC) is performed to ensure that connected metal fills meet design specifications, for example, that connected metal fills are not too close to a signal line. The metal fill method improves the power integrity of the design.

12 Claims, 4 Drawing Sheets

INTEGRATED CIRCUIT WITH POWER NETWORK AWARE METAL FILL

BACKGROUND

The present invention relates generally to physical design and fabrication of semiconductor integrated circuits, and more particularly, to metal fill during IC layout and design.

Integrated circuit (IC) physical design has become increasingly complex as the number of devices on a chip increases and device size decreases. ICs also have an increasing number of layers, including metal layers for routing signals and dielectric layers separating the metal layers. Non-planarity can negatively affect device yields and the effect of non-planarity in one layer can be compounded across other layers. It is well known to use chemical mechanical polishing (CMP) for planarization of dielectric layers during fabrication. However, CMP is impacted by non-planarities in the metal layers. One way to address metal layer non-planarity is by "metal fill". In metal fill, open areas within each metal layer are filled with a metal pattern. However, it is known that rather than just performing indiscriminate metal filling to meet metal density requirements, metal fill can also be used to improve chip performance, such as by reducing cross coupling capacitance as taught by U.S. Pat. No. 8,753,900.

FIG. 1 shows a conventional IC design and fabrication process. At step 10, IC design is performed by an IC designer to meet the functional requirements of the chip specification and a design file or netlist is prepared. At step 12, place and route are performed using electronic design automation (EDA) tools, where the various circuit blocks (sometimes referred to as IPs) and their interconnections, as specified in the design file, are placed within the chip boundaries and signals interconnecting the blocks are routed, and then timing analysis is performed. Place and route and its sub-steps may be re-iterated until the design meets timing requirements. At step 14, metal filling is performed, which generally means that empty spaces within the metal layers are filled with metal in order to meet minimum metal density requirements and in addition, as noted above, to possibly improve cross coupling capacitance. The metal fill patterns are determined by algorithms within the EDA tools. After metal fill, a GDS (Graphic Design System) file is prepared (i.e., tape-out) and sent to a manufacturer so that the chip can be fabricated. An example of an EDA tool for conducting place and route, metal fill, and generating the GDS file is Cadence® Encounter®.

System on Chips (SoCs) often include various analog blocks, memories, multi-cores and multi-power domains, and require a sophisticated power grid to deliver the correct amount of power to the correct domains. All of these differing power requirements can cause the power grid to be discontinuous at many places during the design stage. The power required by a SoC is also effected by limited numbers of power and ground pins.

It would be advantageous if metal fill could be used to not only meet metal layer density requirements, but also to take into account and help meet circuit power requirements.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
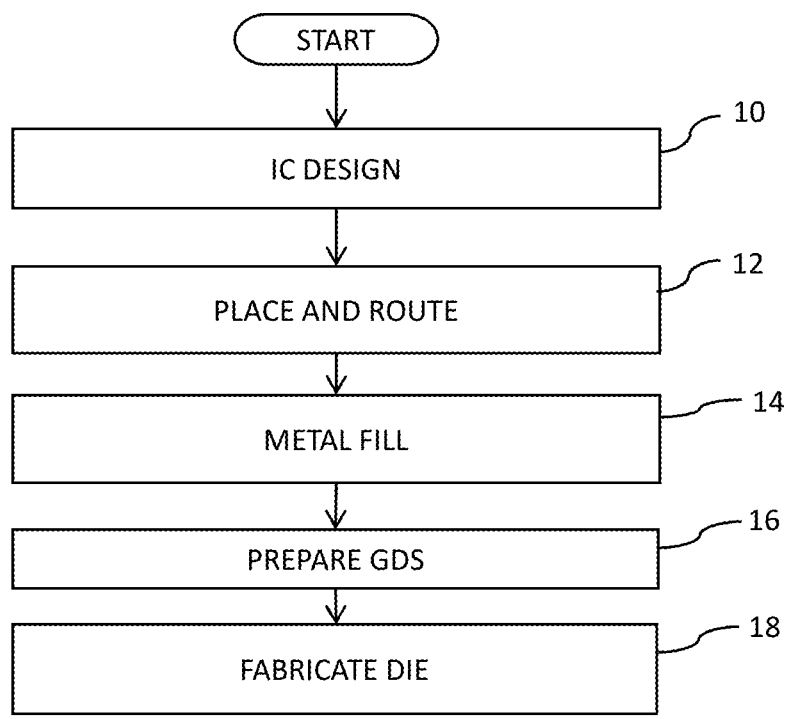
FIG. 1 is a simplified flow chart of a conventional method of designing and fabricating a semiconductor integrated circuit.

Detailed illustrative embodiments of the present invention are disclosed herein. However, specific structural and functional details disclosed herein are merely representative for purposes of describing example embodiments of the present invention. The invention may, however, be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

The present invention provides a metal filling method for an integrated circuit design that takes into account the power requirements of the design and then performs metal fill that aids in addressing those requirements. According to an embodiment of the present invention, an IC design is divided on the basis of weakness of power and/or ground, where a relative weakness of the grid (power or ground) in any local region is estimated and the estimation information is used in a PG (power/ground) flooding script (i.e., software that controls placement of the metal fill). The initial design is thus updated with the metal fills and a chip is fabricated using the updated design file.

The present invention provides a computer implemented method for forming an integrated circuit (IC), including the steps of: (a) receiving an IC design comprising a functional description of the IC including circuit blocks that have been placed and routed; (b) extracting power and ground networks of the IC design; (c) calculating a least resistance path (LRP) of the power and ground networks for each cell of the IC design; (d) determining average LRPs of the power and ground networks for various regions of the IC design; and (e) filling the cells in the regions with one of power and ground tiles depending on the average LRP of the region.

Figure 2:
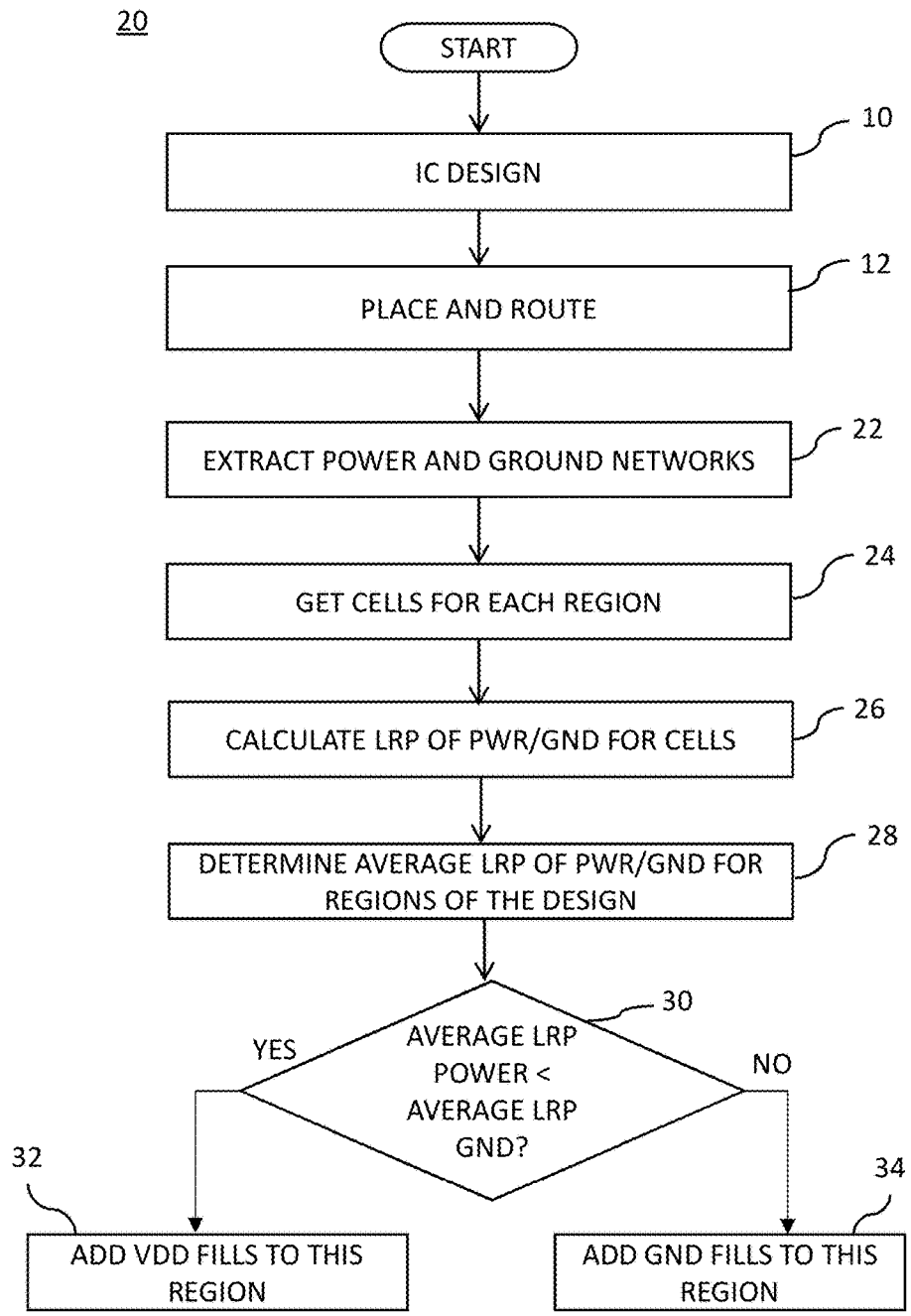
FIG. 2 is a flow chart of a first step of a method of physical design of a semiconductor IC in accordance with an embodiment of the present invention.

The present invention provides a computer implemented method for the physical design of an IC. The method is divided into two parts. In a first part, a design is searched for weak power (VDD) and ground (GND) regions and metal filling is performed in these regions. In a second part, redundancies are optimized by connecting the fills to each other, as explained in more detail below. Referring now to FIG. 2, a flow chart 20 of a first part of a method of physical design of a semiconductor IC in accordance with an embodiment of the present invention is shown. As with the conventional method, at step 10, IC design is performed by an IC designer to meet the functional requirements of the chip specification and a design file or netlist is prepared. At step 12, place and route are performed using EDA tools, where the various circuit blocks/IPs and their interconnections, as specified in the design file, are placed within the chip boundaries and signals interconnecting the blocks are routed, and then timing analysis is performed (e.g., STA). Place and route and its sub-steps may be re-iterated until the design meets timing requirements. In this manner, a design file comprising a functional description of the IC including circuit blocks that have been placed and routed is generated.

Figure 4:
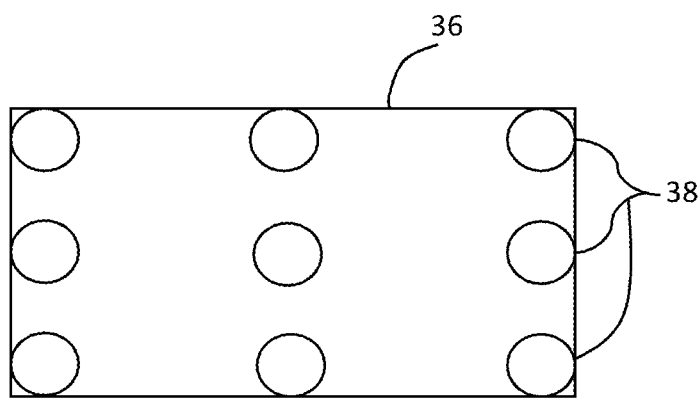
FIG. 4 is a schematic diagram of a region within a metal layer of an IC.

At step 22, the power and ground networks are extracted from the design file. The power and ground networks can be extracted from a design file using a commercially available EDA tool such as RedHawk made by ANSYS, Inc. of Canonsburg, Pa. At step 24, the design is divided into a number of regions and the cells in each region are determined. In one embodiment of the present invention, a region is defined as a rectangular or square block having dimensions (x/m)×(y/n), where x and y are the width (X-axis) and length (Y-axis) of the chip (i.e., measurements in the horizontal and vertical directions, respectively) and the variables m and n are programmable variables that can be defined by a user. The variables "m" and "n" affect the run-time of the metal fill program and may be selected accordingly. Thus, the chip is divided into "m"×"n" regions (e.g., in one example, m=30 and n=30 so there would be 900 regions). For every region, 'i' cells are selected, where "i" also is a user programmable variable. At step 26, a Least Resistance Path (LRP) for one or both of power and ground are calculated for these cells, by, for example, using RedHawk. FIG. 4 is a schematic diagram of a region 36 having cells 38. In one embodiment of the invention, LRP of only a predetermined number "i" of the cells 38 is calculated. For example, LRP of the power and ground networks is calculated for 'i' cells, where "i" is a user defined variable typically selected based on program run-time. In one example, the "i" selected cells 38 within the region 36 would be those cells located along the periphery as well as those located at the center of the selected region. Then, calculating the LRP of the power and ground networks for one of the cells 38 comprises calculating the resistance of a path from the cell to power and ground sources by selecting one source at a time. LRP is the path offering the least resistance from the source (power or ground) to the cell. For each cell there is one power source and one ground source based on which LRP is calculated.

At step 28, average LRPs of the power and ground networks of the regions are calculated. In one embodiment, the average LRP calculation is a straight-forward average calculation in which the average LRPs for the cells within a region are summed and then the sum is divided by the number of cells summed. At step 30, the average LRP for power is then compared to the average LRP for ground. If the average LRP for power is greater than the average LRP for ground, then ground metal fills (metal fills connected to global ground network or VSS) are added to the region (step 32)—that is, the region is filled with ground tiles. On the other hand, if the average LRP for power is less than the average LRP for ground, then power metal fills are added to the region (step 34)—that is, the region is filled with power tiles (metal fills connected to global power supply or VDD).

These two metal fill steps 32 and 34 are similar to the metal fill step 14 of the conventional method except that the metal fills are targeted with more or fewer power and ground tiles.

Figure 3:
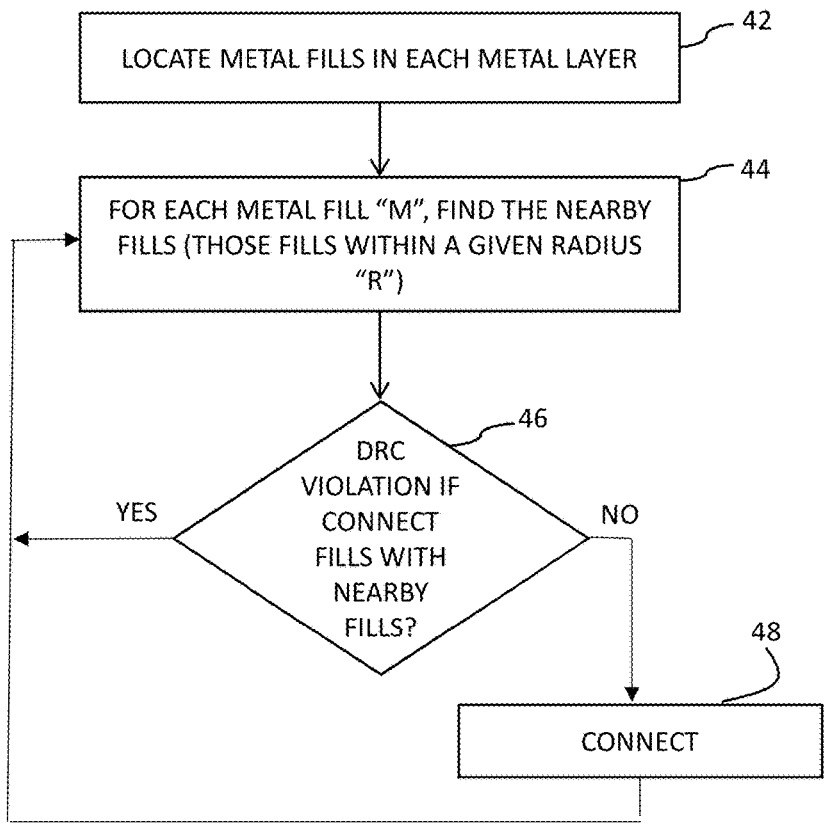
FIG. 3 is a flow chart of a second step in the physical design method of FIG. 2.

In a second part of the metal fill method of the present invention, redundancies are optimized by connecting the fills to each other, as explained in more detail below with reference to FIG. 3. FIG. 3 is a flow chart 40 of the second step in the physical design method.

As is known by those of ordinary skill in the art, an integrated circuit includes multiple layers, typically alternating between metal layers and insulating layers. For each metal layer of the IC design, the information on the metal fills is collected. Then steps 42 to 48 are performed for each metal layer.

At step 42, all of the metal fills for a particular layer "N" are located—that is, all of the power and ground tiles for layer N are located. At step 44, for each of the located power and ground tiles, all of the nearby power and ground tiles are located. For example, for a given power tile "M", all of the power tiles within a given radius "R" are located, where R can be a user defined variable (e.g., 5 microns). At step 46, if a power metal fill tile was found within radius R of power tile M, a Design Rules Check (DRC) is performed to determine whether connecting the given power tile M with the nearby power tile would cause a design rule error. A design rule error could be violated, for example, if the connected metal fills would be too close to a signal line. That is, one of the design rules specifies a minimum distance of a power and ground tile from a signal line so if the connection between nearby tiles makes the tiles too close to a signal line then the connection between the tiles is not made. Step 46 is performed similarly for a given ground tile and located nearby ground tiles. At step 48, if it is determined that connecting the nearby tiles would not cause a DRC error, then those tiles are connected. As will be understood by those of skill in the art, steps 46 and 48 could be performed in a reverse order such that connections between nearby tiles are made and then a DRC is performed and where DRC errors are discovered, those connections may be undone and then the DRC run again.

Figure 5A:
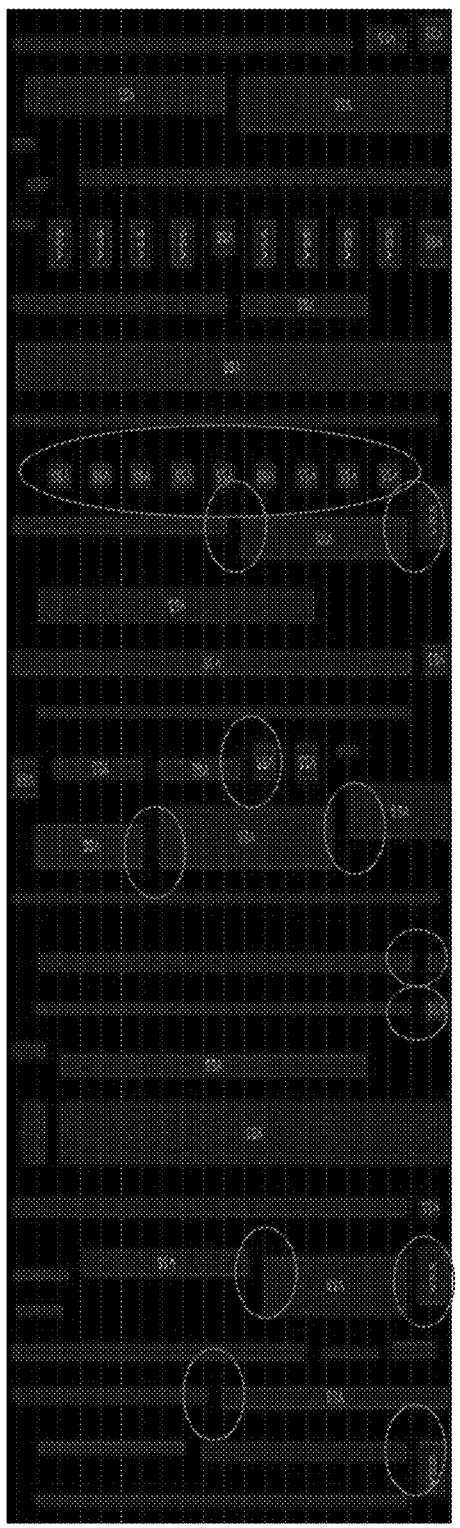
FIG. 5A shows the layout of a metal layer of an IC design after performing the method of FIG. 2.
Figure 5B:
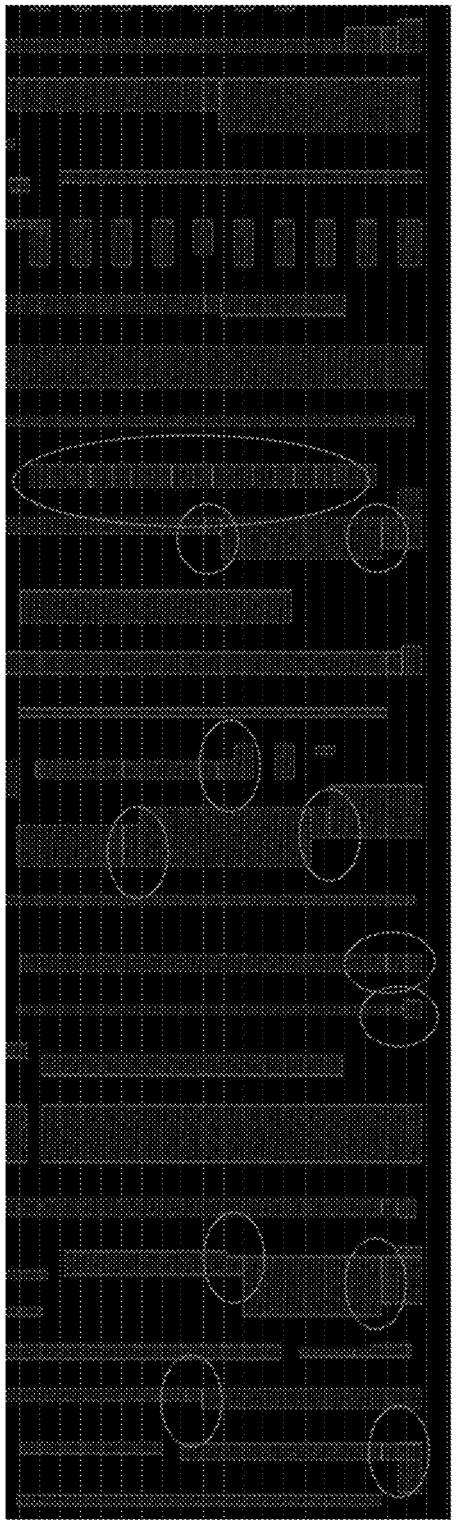
FIG. 5B shows the layout of the metal layer of the IC design of FIG. 5A after performing the method of FIG. 3.

FIG. 5A shows the layout of a metal layer 50 of an IC design after performing the first part of the method shown in FIG. 2. Various areas of the drawing include circles, which indicate ground tiles that are close to each other but not connected. That is, for the metal layer shown 50 in FIG. 5A, ground tiles have been added. FIG. 5B shows the layout of the same metal layer as in FIG. 5A only after performing the second part of the method shown in FIG. 3—and so the metal layer is now labeled as 54 to indicate that it has been changed by the addition of the connections between predetermined ones of the metal fill tiles, as shown. The circles in the drawing illustrate locations where nearby ground tiles have been connected with each other.

Figure 6:
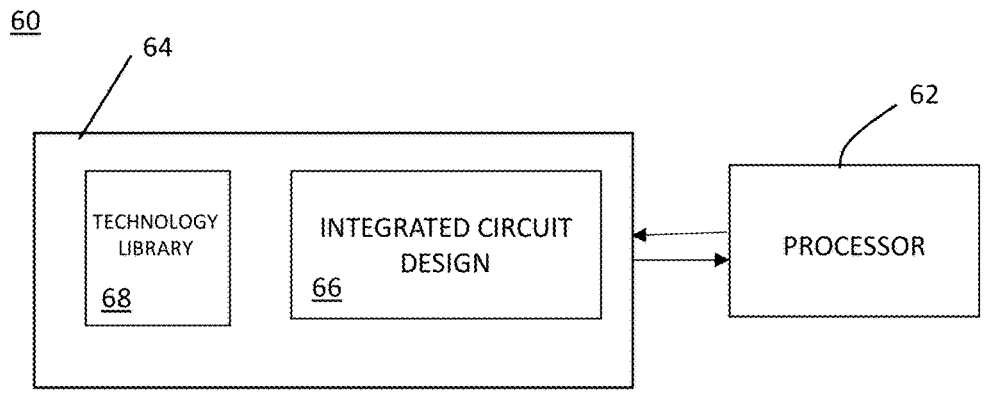
FIG. 6 is a schematic block diagram of a system for performing the method shown in FIGS. 2 and 3.

FIG. 6 is a schematic block diagram of a computer system 60 for performing the method shown in FIGS. 2 and 3. The computer system 60 includes a processor 62 and a memory 64 coupled to the processor 62. The memory 64 is used to store an IC design 66 and a technology library 68. The computer system 60 should be capable of running EDA and CAD tools such as the earlier-mentioned RedHawk program. Systems like the system 60 are well known in the art. The method illustrated in FIGS. 2 and 3 is preferably implemented in software that can be executed by the processor 62.

Because the apparatus (system 60) implementing the present invention comprises electronic components and circuits known to those skilled in the art, circuit details have not be explained in any greater extent than that considered necessary for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 5 and the discussion thereof describe an exemplary computer system, this exemplary system is presented merely to provide a useful reference in discussing various aspects of the invention. Of course, the description of the system has been simplified for purposes of discussion, and it is just one of many different types of appropriate architectures that may be used in accordance with the invention.

Those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 60, for example, from computer readable media or other media on other computer systems. Such computer readable media may be permanently, removably or remotely coupled to an information processing system such as system 60. The computer readable media may include, for example and without limitation, any number of the following: magnetic storage media including disk and tape storage media; optical storage media such as compact disk media (e.g., CD-ROM, CD-R, etc.) and digital disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, the system 60 is a computer system such as a computer system used to perform computer aided design (CAD). Other embodiments may include different types of computer systems. Computer systems are information handling systems which can be designed to give independent computing power to one or more users. Computer systems may be found in many forms including but not limited to mainframes, minicomputers, servers, workstations, personal computers, etc. A typical computer system includes at least one processing unit, associated memory and a number of input/output (I/O) devices.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

The terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless stated otherwise, terms such as "first" and "second" are used to arbitrarily distinguish between the elements such terms describe. Thus, these terms are not necessarily intended to indicate temporal or other prioritization of such elements.

Although the invention is described herein with reference to specific embodiments, various modifications and changes can be made without departing from the scope of the present invention as set forth in the claims below. For example, not every metal layer has to be checked to connect nearby tiles. For example, all of the metal layers used for signal routing could be checked while metal layers used for power and ground routing could be bypassed, such as if a predetermined power grid is used in that metal layer and a different metal fill algorithm used. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The invention claimed is:

1. A computer implemented method for forming an integrated circuit (IC), wherein the computer includes a processor and a memory coupled to the process, the method comprising:
   (a) receiving and storing in the memory an IC design comprising a functional description of the IC including circuit blocks that have been placed and routed;
   (b) extracting, by the processor, power and ground networks of the IC design;
   (c) breaking the IC design up into a predetermined number of regions, by the processor, wherein each region includes a plurality of cells;
   (d) calculating, by the processor, a least resistance path (LRP) of the power and ground networks for a predetermined number of the cells within each region;
   (e) determining, by the processor, average LRPs of the power and ground networks for each region of the IC design;
   (f) filling, by the processor, the cells in said regions with one of power and ground tiles depending on the average LRP of said region, thereby generating a new IC design; and
   storing the new IC design in the memory and
   performing a design rules check on the new IC design to ensure that connecting the located power and ground tiles with respective nearby power and ground tiles does not violate predetermined design rules.

2. The method of claim 1, wherein step (f) filling the cells comprises:
   if, in a given region, the average LRP of the power network is less than the average LRP of the ground network, then filling the cells in the given region with power tiles, and if the average LRP of the power network is greater than the average LRP of the ground network, then filling the cells in the given region with ground tiles.

3. The method of claim 1, wherein a region is defined as a generally rectangular area of dimension (x/m)×(y/n), where x and y represent a width and a length of a chip boundary and "m" and "n" are user-programmable values.

4. The method of claim 1, wherein in step (d), calculating the LRP of the power and ground networks for the cells, comprises calculating the resistance of the path from the cell to power and ground sources.

5. The method of claim 1, wherein calculating the average LRP of a region comprises adding the LRPs of the cells in said region and then dividing the sum by the number of cells in said region.

6. The method of claim 1, further comprising:
   (g) locating all of the power and ground tiles in a metal layer of the IC;
   (h) for one of the located power and ground tiles, locating all of the nearby power and ground tiles; and
   (i) connecting the nearby power and ground tiles with the one of the located power and ground tiles.

7. The method of claim 6, wherein nearby comprises a user programmable distance 'R'.

8. The method of claim 6, wherein one of the design rules specifies a minimum distance of a power and ground tile from a signal line.

9. The method of claim 6, wherein steps (g), (h) and (i) are performed for each metal layer of the IC.

10. An integrated circuit fabricated in accordance with the method of claim 1.

11. An integrated circuit fabricated in accordance with the method of claim 6.

12. The method of claim 1, further comprising the step of fabricating an IC using the new IC design.

* * * * *